United States Patent [19]

Yoshida et al.

[11] Patent Number: 4,985,484

[45] Date of Patent: Jan. 15, 1991

[54] PROCESS FOR THE PRODUCTION OF COATING COMPOSITIONS CONTAINING MICROCAPSULES

[75] Inventors: Noble H. Yoshida; John Brabender, both of Chillicothe, Ohio

[73] Assignee: The Mead Corporation, Dayton, Ohio

[21] Appl. No.: 315,959

[22] Filed: Feb. 27, 1989

[51] Int. Cl.[5] .............................................. C08L 75/02

[52] U.S. Cl. .................................... 524/379; 524/391; 106/20; 427/350; 428/402.21

[58] Field of Search ...................... 106/20; 428/402.21; 427/350; 524/391, 379

[56] References Cited

U.S. PATENT DOCUMENTS 4,171,981 10/1979 Austin et al. ........................ 428/914

4,847,152 7/1989 Jabs et al. ........................... 503/215

*Primary Examiner*—Maurice J. Welsh

*Attorney, Agent, or Firm*—Thompson, Hine and Flory

[57] ABSTRACT

A process for the preparation of a coating composition containing microcapsules comprising the steps of:

(a) preparing an aqueous dispersion of microcapsules, (b) adding a flow control agent to said aqueous dispersion microcapsules, (c) applying heat and vacuum to said aqueous dispersion of microcapsules containing said flow control agent to remove water from said dispersion of microcapsules and thereby concentrate said dispersion of microcapsules and (d) adding said concentrated dispersion of microcapsules to a printing ink vehicle to form a coating composition.

12 Claims, No Drawings

PROCESS FOR THE PRODUCTION OF COATING COMPOSITIONS CONTAINING MICROCAPSULES

BACKGROUND OF THE INVENTION

The present invention relates to a process for preparing coating compositions containing microcapsules. In particular it relates to a process for concentrating an aqueous slurry of microcapsules to provide a high solid ink which can be press applied with little or no drying.

In the manufacture of pressure-sensitive recording papers, a layer of pressure-rupturable microcapsules containing a solution of colorless dyestuff precursor is coated on the back side of the front sheet of paper of a carbonless copy paper set. This coated backside is known as the CB coating. In order to develop an image or copy, the CB coating is mated with a paper containing a coating of a suitable color developer, also known as dyestuff acceptor, on its front. This coated front color developer coating is called the CF coating. The color developer is a material, usually acidic, capable of forming the color of the dyestuff by reaction with the dyestuff precursor.

Marking of the pressure-sensitive recording papers is effected by rupturing the capsules in the CB coating by means of pressure to cause the dyestuff precursor solution to be exuded onto the front of the mated sheet below it. The colorless or slightly colored dyestuff, or dyestuff precursor, then reacts with the color developer in the areas at which pressure was applied, thereby effecting the colored marking. Such mechanism for the technique of producing pressure-sensitive recording papers is well known.

Among the well known color developers used on CF record sheets are phenolic-type resins, such as acetylated phenolic resins, salicylic acid modified phenolics and, particularly, novolac type phenolic resins.

Among the well known basic, reactive, colorless chromogenic dye precursors useful for developing colored marks when and where applied to a receiving sheet coated with such color developers are Crystal Violet Lactone (CVL), the p-toluenesulfonate salt of Michler's Hydrol or 4,4'-bis(diethyllamino)benzhydrol, Benzoyl Leuco Methylene Blue (BLMB), Indolyl Red, Malachite Green Lactone 8'-methoxybenzoindoline spiropyran, Rhodamine Lactone, and mixtures thereof.

A number of microencapsulation techniques have been used to prepare oil-containing microcapsules. Some of the principal techniques are complex coacervation (typically used to prepare gelatin capsules), in situ polymerization (typically used to prepare polyurethane and polyurea capsules).

For some applications it is desirable to separate the microcapsules from the dispersion in which they are prepared. One such application is the preparation of coating compositions which are designed to be printed on or spot coated on paper to provide a carbonless form.

A number of techniques have been used to separate microcapsules. One of the principal techniques is spray drying. U.S. Pat. No. 4,139,392 to Davis et al. discloses a hot melt coating composition containing microcapsules in which microcapsules are spray dried to form a free flowing powder which is dispersed in a wax composition with the aid of an anionic dispersing agent.

U.S. Pat. No. 4,171,981 to Austin et al. describes another method for preparing a print on composition containing microcapsules in which an aqueous slurry of microcapsules is mixed with a hot melt suspending medium and a wiped film evaporator is used to remove the water.

U.S. Pat. No. 4,729,792 to Seitz discloses yet another method in which microcapsules are prepared by interfacial crosslinking of a polysalt formed by reaction of a polyamine and a polyanionic emulsifier with a polyisocyanate. The microcapsules are separated by adding a lipophilizing agent to the capsule slurry. The lipophilizing agent reacts with the polyanionic emulsifier and renders it non-polar such that the microcapsules precipitate from the slurry. The microcapsules can then be dispersed in an ink vehicle with the aid of a dispersing agent. It should be noted that dispersing agents are necessary for dispersing in both polar and non-polar printing ink vehicle.

SUMMARY OF THE INVENTION

The invention relates to a process for the production of a concentrated aqueous coating composition containing microcapsules. The process comprises the steps of preparing an aqueous dispersion of microcapsules, adding a flow control agent to the dispersion of microcapsules, applying a combination of heat and vacuum to the dispersion of microcapsules to remove water from the dispersion and thereby concentrate the dispersion, and adding the concentrated dispersion of microcapsules to an aqueous-based ink vehicle.

In accordance with the preferred embodiments of the invention, heat and vacuum are applied to the dispersion using a piece of equipment known as a wiped film evaporator. The flow control agent is a water miscible liquid having a boiling point greater than the boiling point of water under the conditions under which the wiped film evaporator is operated. The function of the flow control agent is to maintain a sufficiently low viscosity in the evaporator that the dispersion of the microcapsules readily passes through the evaporator as it looses water. If the flow control agent is not used, the dispersion of microcapsules can thicken to the point that it accumulates in the evaporator and does not pass through it.

DETAILED DESCRIPTION OF THE INVENTION

In concentrating the dispersion of microcapsules it is essential that the microcapsules are not ruptured or damaged to the extent that they are functionally ineffective. One difficulty lies in the sensitivity of the microcapsules to heat; another lies in the viscosity of the concentrated slurry.

By controlling the conditions of evaporation as follows, a concentrated dispersion of microcapsules can be produced:

1. The microcapsules are substantially discrete microcapsules (not polynuclear masses).
2. The temperature of evaporation is low enough to prevent deterioration of the microcapsules.
3. The vacuum is high enough to reduce the boiling point yet not high enough to rupture the microcapsules.
4. A water miscible flow aid is present which does not evaporate substantially as the water is removed to maintain a sufficiently low viscosity that the microcapsules flow through or from the evaporator.

The particular wall-forming materials or the particular encapsulated chromogenic material are not asserted to be an inventive feature herein. Rather, there are described in the patent literature various capsular chromogenic materials and wall forming materials which may be used. The microcapsule dispersion can be prepared by a variety of known techniques including coacrrvation, interfacial polymerization, polymerization of one or more monomers in an oil, various melting dispersing and cooling methods. Compounds which have been found preferable for use as wall-forming materials in the various microencapsulation techniques included: hydroxy-propylcellulose (see U.S. Pat. No. 4,025,455 to Davis et al.), methylcellulose, carboxymethylcellulose, gelatin (see U.S. Pat. Nos. 2,730,456 and 2,800,457 to Green), melamine-formaldehyde, (see U.S. Pat. No. 3,755,190), polyfunctional isocyanates and prepolymers thereof (see U.S. Pat. Nos. 3,914,511; 3,796,669; 4,356,108; 4,404,251; and 4,051,165), polyfunctional acid chlorides, polyamines, polyols epoxides and mixtures thereof. Preferred microcapsules are polyurea microcapsules prepared by interfacial polymerization of a polyisocyanate contained in the oil phase and a polyamine contained in the aqueous phase. Examples of useful polyisocyanates include the biuret of 1,6-hexmethylenediisocyanate, isophorone diisocyanate, 2,4-tolylene diisocyanate and hexmethylenediisocyanate trimer (isocyanurate). An example of a useful polyamine is diethylenetriamine.

Any of the color precursors or color formers known in the art can be used, the color precursors most useful in the practice of the preferred embodiment of this invention are the color precursors of the electron-donating type. The preferred group of electron-donating color precursors include the lactone phthalides, such as crystal violet lactone, and 3,3-bis-(1′-ethyl-2-methylindon-3″-yl) phthalide, the lactone fluorans, such as 2-dibenzylamino-6-diethylaminofluoran and 6-diethylamino-1, 3-dimethylfluorans, the lactone xanthenes, the leucoauramines, the 2-(omega substituted vinylene)-3,3-disubstituted-3-H-indoles and 1,3,3-trialkylindolinospirans. Mixtures of these color precursors can be used if desired.

Using the process of the instant invention, concentration of the microcapsular dispersion is accomplished in one process step. The process may be either batch or continuous. In the batch process, the dispersion of microcapsules can be heated and a vacuum is applied to the closed environment. The temperature must be above the boiling point of water at the particular vacuum used. In practice, such an environment can be conveniently produced in a closed vessel such as a resin kettle and in a variety of additional commercially available closed containers where the application of heat and vacuum can be controlled. In this apparatus, the dispersion of microcapsules can be introduced into the kettle batchwise and the heat and vacuum can be applied and maintained until the desired amount of water is removed from the system. Depending on the size of the batch and the rate of transfer of heat into the batch, this may take a matter of minutes to several hours. Turbulent mixing of the low shear type, such as by a rotating paddle, of the mixture in the kettle materially reduces the time of batch treatment and improves the dispersion of the microcapsules. For purposes of this application the term "low-shear" shall be understood to refer to the shear sufficient to perform satisfactory turbulent mixing without at the same time rupturing or otherwise causing substantial deterioration of the microcapsule. It should further be understood that the shear which can be used satisfactorily will vary depending among other things on the type of microcapsules used.

A preferred form of the process can be obtained using a thin film or wiped film evaporator. Such evaporators are generally tubular in construction with the evaporating section of the tube being equipped with rotating wiper blades. The wiper blades may contact the cylindrical walls of the evaporator or there may be a slight gap in the order of several microns between the wiper blades and the wall. In either case, a thin film of the liquid to be treated is formed on the cylinder wall by the centrifugal action and wiping of the rotating blades. The rotating blades continuously agitate the thin film material being treated and keep it in a turbulent condition as it passes through the evaporating section. Treatment times are in the order of a few seconds. Heat necessary for the evaporation of the water is applied through the walls of the evaporator. Thus, the temperature of the material being treated can be maintained at the desired temperature by controlling the temperature of the applied heat.

Both horizontally and vertically mounted thin film evaporators may be used successfully in the process of this invention. By horizontally mounted is meant that the axis of the tube and rotating wiper blades is horizontal. Likewise, in vertically mounted thin film evaporators the axis of the tubes and rotating wiper blades is vertical. This thin film evaporator apparatus has the advantage of being capable of operating in a manner in which the aqueous dispersion of microcapsules can be continuously introduced ahead of the rotating wiper blades and withdrawing the concentrated dispersion of microcapsules at a point after passing through the rotating wiper blades of the evaporator. A significant advantage is that the dwell time of the dispersion in the evaporator can be a matter of seconds which materially reduces the possibility of degradation and/or deterioration of the microcapsules. In practice the inlet and outlet ports may be located just within the rotating blade section of the device. The particular construction of the evaporator is not asserted to be an inventive feature of this invention. The dispersion of microcapsules can be withdrawn from the evaporator either continuously or intermittently, as desired, using any convenient means of removal such as by pumping.

In the preferred form of this process, a stream of the aqueous dispersion of microcapsules is continuously introduced into a thin film evaporator at the beginning of the rotating blade section. The blades may rotate at speeds of, for example, 600 to 1000 rpm. Turbulent, low shear agitation is maintained during the evaporation by the rotating wiper blades.

Throughout the preferred process of this invention the temperature is maintained at a temperature above the boiling point of water at the vacuum conditions in the evaporator to provide quick evaporation of the water. Maintaining too high a temperature can deteriorate and effectively prohibit the ability of the microcapsules to function properly. High temperatures cause the microcapsules to agglomerate and in some cases cause the microcapsule wall to swell to the point where they lose their contents by permeation or rupture. The temperature at which this deterioration occurs varies widely depending on the interaction of the particular wall-forming material used in making the microcapsules and the particular hot melt suspending medium. Temperatures on the order of 60°–70° C. have been found to be satisfactory.

The vacuum used in this operation is to reduce the boiling point thus permitting rapid removal of the volatile solvent by evaporation without prolonged exposure of the capsules to high temperatures particularly when in contact with water. A vacuum of about 450 to 200 and preferably 300 mmHg is useful.

Microcapsules tend to deteriorate rapidly with prolonged exposure to water at 100° C. Using the wiped film evaporator, the dwell time of the microcapsules in contact with the hot water can be materially reduced being on the average only a few seconds before the water is evaporated. By metering the flow of the aqueous dispersion the amount of water removed from the dispersion can be controlled. This will also vary with the design of the evaporator and the speed of the wiper blades. Feed rates of about 10 to 20 lbs/hr. are normally used.

In order to obtain a concentrated slurry which readily flows through the evaporator, which is readily dispersible in the ink vehicle and to minimize damage to the microcapsules, a flow control agent is added to the slurry before it is concentrated. Useful flow control agents are characterized in that they are miscible with water and they evaporate at a much lower rate under the temperature and vacuum used to concentrate the slurry. Generally, the flow control agent should have a boiling point greater than 120° C. at normal pressure. Numerous compounds are useful. Particularly preferred compounds are useful. Particularly preferred compounds are polyols and glycols such as propylene glycol, ethylene glycol, polyethylene glycol, glycerol, butanediol, pentanediols, etc. The amount of the flow control agent used will depend on the particular agent selected, evaporation conditions, and the nature of the dispersion of microcapsules. The amount must be sufficient to maintain flowability and to permit the microcapsules to be dispersed in the printing ink vehicle. Generally the amount will range from about 5% to 20% based on total solids of the slurry.

Initially the dispersion may contain as little as 20 to 50% microcapsules as solids. The dispersion of microcapsules is preferably concentrated to about 60 to 80% solids and more preferably 65 to 75% solids. The concentrated dispersion is added to an aqueous based printing ink vehicle to provide a composition suitable for coating.

Known printing ink vehicles may be used in the present invention. A particularly preferred vehicle is latexes such as polyvinyl alcohol, polyacrylic latex, etc. These latexes generally contain about 50% solids. The latex is mixed with the concentrated dispersion of microcapsules in a weight ratio of about 6–8 parts microcapsule dispersion per one part latex. More particularly, an optimum solids contents for the coating composition is about 65 to 85% solids of which about 3 to 10% is the ink vehicle and to 45 to 75% is the microcapsules. Accordingly a dispersion of microcapsules containing 70% solids may be mixed in a ratio of 7 parts microcapsules to about 1 part latex to provide a suitable coating composition.

If necessary or desirable, a dispersing agent or wetting agent may be added to the microcapsules prior to adding them to the ink vehicle to facilitate their dispersion into the ink vehicle. Representative examples of dispersing agents include Dispex 40 (polyacrylate sodium salt). The dispersing agent may be added to the dispersion in an amount of about 0.1 to 10% dry weight.

A number of processes may be used to apply the coating composition to a paper substrate. The process of the present invention is designed to provide coating compositions which can be press applied. U.S. Pat. Nos. 3,016,308 and 3,914,511 discloses process for applying compositions containing microcapsules by rotogravure or flexoprinting. U.S. Pat. Nos. 3,079,351 and 3,684,549 disclose processes for press applying wax based compositions.

The present invention is illustrated in more detail by the following non-limiting examples:

PREPARATION OF POLYUREA CAPSULES

The following Solution A and Solution B were prepared:

Solution A

| Solution A | |
|---|---|
| Sure-Sol 290 (alkyl biphenyl mixture from Koch Chemical Co., Corpus Christie, TX) | 22,356 g |
| Sure-Sol X-210 (alkyl aromatic hydrocarbon from Koch Chemical Co., Corpus Christie, TX) | 14,904 g |
| Crystal Violet Lactone | 3,622 g |
| SF-50 isocyanate (toluene diisocyanate adduct available from Polyblends, Inc., Livonia, MI) | 1,043 g |
| N-100 isocyanate (aliphatic polyisocyanate Mobay Chemical Co.) | 3,273 g |

Solution B

| Solution B | |
|---|---|
| Gum Arabic | 2,312 g |
| Water | 11.65 gal. |

Solution B has a pH of 5 where gum arabic is "strongly negative". Solution A is emulsified into Solution B over a period of 6 minutes. The emulsion is emulsified another 24 minutes for a total of 30 minutes, inline rpm @7,650. The emulsion is pumped to the reactor and the following Solution C is added.

Solution C

| Solution C | |
|---|---|
| CMC 7 L1T (sodium carboxy methyl cellulose; low molecular weight, D.S. = 0.7, technical grade from Hercules, Inc., Wilmington, DE | 241.5 g |
| Diethylenetriamine | 1200.6 g |
| Water | 12075 g |

HCl to pH 4.35 w=were the amine is blocked as a hydrochloric acid salt.

The mixture is then made alkaline—pH 10—with 50% NaOH. To 100 g of the polyurea microcapsule slurry (40–46% solids) prepared in Example 1 were added 21 gms of propylene glycol and 0.05 gm of Displex-40. This mixture was stirred and passed through the wipe film evaporator (model no. 4TFP, from Votator, Div. of Chemetron Processing Equipment) at a rate of 50 lbs/hr. The evaporator was operated at a temperature of 70°–75° C., a pressure of 350 psi.

The removal of water from said dispersion of microcapsules was accomplished and thereby concentrated the dispersion of microcapsules.

Having described the invention in detail and by reference to preferred embodiments thereof, it will be apparent that modifications and variations are possible without departing from the scope of the invention defined in the appended claims.

What is claimed is:

1. A process for the preparation of a coating composition containing microcapsules comprising the steps of:

(a) preparing an aqueous dispersion of microcapsules, (b) adding a flow control agent to said aqueous dispersion microcapsules, said flow control agent being selected from the group consisting of propylene glycol, ethylene glycol, glycerol, butanediol, and pentane diol, (c) applying heat and vacuum to said aqueous dispersion of microcapsules containing said flow control agent while continuously metering said dispersion of microcapsules to a wiped film evaporator and continuously forming a thin film of said dispersion of microcapsules on the walls of said evaporator to remove water from said dispersion of microcapsules and thereby concentrate said dispersion of microcapsules, and (d) adding said concentrated dispersion of microcapsules to a printing ink vehicle to form a coating composition.

2. The process of claim 1 wherein said printing ink vehicle is a latex.

3. The process of claim 2 wherein said latex is a polyvinyl alcohol latex.

4. The process of claim 3 wherein said glycol is propylene glycol.

5. The process of claim 1 wherein said dispersion of microcapsules contains about 20 to 50 % solids.

6. The process of claim 5 wherein said dispersion of microcapsules is concentrated to about 60 to 80% solids.

7. The process of claim 1 wherein said flow control agent is added to said dispersion in an amount of about 5 to 20%.

8. The process of claim 1 wherein said coating composition contains about 60–70% solids.

9. The process of claim 8 wherein said coating composition contains about 3 to 10% latex (solids) and about 45 to 65% microcapsules (solids).

10. The process of claim 1 wherein said microcapsules are polyurea microcapsules.

11. The process of claim 10 wherein said polyurea microcapsules are prepared by interfacial polymerization of a polyisocyanate and a polyamine.

12. The process of claim 11 wherein said microcapsules are prepared by dispersing an oily phase containing said polyisocyanate in an aqueous phase containing said polyamine.

* * * * *